United States Patent [19]

Jean et al.

[11] Patent Number: 5,222,167
[45] Date of Patent: Jun. 22, 1993

[54] OPTICAL COUPLER AND METHOD OF MANUFACTURING

[75] Inventors: Fabrice Jean, Fontainebleau; Martin McCourt, Avon, both of France

[73] Assignee: Corning Incorporated, Corning, N.Y.

[21] Appl. No.: 876,954

[22] Filed: Apr. 30, 1992

[30] Foreign Application Priority Data

May 17, 1991 [FR] France ............................. 91 060039

[51] Int. Cl.$^5$ .............................................. G02B 6/26
[52] U.S. Cl. ...................................... 385/45; 385/39; 385/42
[58] Field of Search ....................... 385/45, 39, 41, 42, 385/43, 40; 372/50

[56] References Cited

U.S. PATENT DOCUMENTS 4,232,385 11/1980 Hara et al. ...................... 385/45 X
4,760,580 7/1988 Thompson et al. .............. 385/45 X

FOREIGN PATENT DOCUMENTS 0324492 7/1989 European Pat. Off. .
2516975 10/1976 Fed. Rep. of Germany .

OTHER PUBLICATIONS

Voirin, et al., "Performances of an Ion Exchanged Star Coupler for Multimode Optical Communications", pp. 229–231, in "Integrated Optics—Proceedings of the 3rd European Conference, ECIO '85, Berlin, Germany, May 6–8, 1985" published by Springer-Verlag, Berlin/-New York.

Nourshargh et al., "Integrated Optic 1×4 Splitter in SiO$_2$/GeO$_2$", Electronics Letters, vol. 25, No. 15, Jul. 20, 1989, pp. 981–982.

Becker et al., "Low-Loss Multiple-Branching Circuit in Ti-Indiffused LiNbO$_3$ Channel Waveguides", Optics Letters, vol. 9, No. 6, Jun. 1984, pp. 246–248.

*Primary Examiner*—John D. Lee
*Assistant Examiner*—Phan Thi Heartney
*Attorney, Agent, or Firm*—K. McNeill Taylor, Jr.

[57] ABSTRACT

An optical coupler with an input and $2^n$ outputs comprises a plurality of substantially coplanar waveguides, each optically coupling said input to one of said $2^n$ coupler outputs, said waveguides comprising a plurality of waveguide sections connecting n stages of Y-junctions disposed along each waveguide path in a tree and branch arrangement, and further comprises a first junction ($J_{21}$), having an axis not parallel to that of said coupler, which is connected to two second junctions ($J_{31}$, $J_{32}$) by curved waveguide sections without singularities, wherein any inflection point along any one of the waveguides, between the input and the nth stage of the junctions, is situated at one of the n junctions along the waveguide path. The coupler may be successfully applied to splitters or combiners and carried out in integrated optics, and a method for designing the mask used in the manufacture of the integrated optics coupler is also described.

14 Claims, 2 Drawing Sheets

OPTICAL COUPLER AND METHOD OF MANUFACTURING

BACKGROUND OF THE INVENTION

The present invention relates to optical couplers and, more particularly, one which is made up of a number of waveguides which are substantially coplanar, each optically coupling a single coupler input to one of $2^n$ coupler outputs. The waveguides comprise waveguide sections in a tree and branch arrangement connecting n Y-junctions disposed along each waveguide path. The invention also relates to a process for the manufacture of said coupler.

Such optical couplers are known in the art and are also called beam splitters or combiners according to whether they divide or combine light beams. They are utilized in diverse applications such as, for example, telecommunications by multimode or single mode optical fibers within a range of wavelengths from 600 to 1600 nm.

Thus, various waveguide patterns have been proposed for such couplers, which can be integrated in a substrate by various techniques which involve masking and photolithography combined with ion exchange, deposition, diffusion, etching or epitaxial growth techniques, depending upon the type of substrate used, for forming the waveguides within or upon the substrate following a design defined by the mask.

FIG. 1 depicts a prior art example of such a design which has been utilized, for example, to create a coupler with one input and sixteen outputs which is called a 1 by 16 coupler. Only one half of the waveguide pattern of the coupler has been represented, as the design is symmetric with respect to the longitudinal axis, X, of the coupler. The representation given here has been significantly distorted parallel to axis, X, in order to present the geometric characteristics more clearly.

If one assumes that the coupler is utilized as a splitter designed to receive a light beam at its input junction J11 and to divide this beam in a tree and branch manner into $2^n$ beams (n=4) coming out at as many outputs S1 to S16 separated by constant spacing (only outputs S1 to S8 are represented) it is apparent that n stages of junctions are necessary to assure the division of the input beam, these stages of junctions being formed respectively by the junctions: J11; J21 etc.; J31, J32 etc.; and, J41, J42, J43, J44 etc.

Considering now the pattern of the waveguide sections which couple these junctions, it becomes evident that these sections exhibit multiple inflection points, as much within the junctions themselves as between those junctions where one again finds a inflection point. These multiple inflection points are necessary, along a given section, in order to return the axis of symmetry of each junction parallel to the longitudinal X axis of the coupler. Such a pattern is known in the prior art, for example, from German patent No. 25 16 975.

The required longitudinal dimension $L_1$ of the pattern of FIG. 1 is penalized by the multiple changes of curvature of the waveguide sections which connect the junctions. It is desirable to reduce this required dimension for several reasons.

On the one hand, as couplers of the type in question are fabricated by photolithographic techniques upon a substrate by a plurality of patterns reproducing the same elementary design, a reduction of the required longitudinal dimension of the design would permit the manufacture of more couplers upon the same substrate surface, thereby increasing, the production rate for the coupler and at the same time lowering the cost of manufacture.

On the other hand, couplers produced by integrated optics take the form of elongated bars of glass or silica, for example, several centimeters in length. The greater the length of these bars, the more susceptible they are to cutting stresses which may result in shattering. A reduction of their length would reduce their fragility.

To reduce the required longitudinal dimension of the coupler one could consider displacing the design of the waveguides laterally by relinquishing the idea of maintaining junctions parallel to the longitudinal axis of the coupler as is represented in FIG. 2 of Voirin, "Performances of an Ion Exchanged Star Coupler for Multimode Optical Communications", pages 229 to 231, in "Integrated Optics - Proceedings of the 3rd European Conference, ECIO '85, BERLIN, Germany, May 6–8, 1985" published by Springer-Verlag. The design proposed by Voirin, only for a multimode coupler, contains angular points at all of the junctions, and other angular points between the last stage of junctions and the coupler outputs; these angular points or singularities, result in an estimated loss of light energy of approximately 0.2 dB across the transition. These losses can negatively affect not only the transmitted optical signal power of the coupler, but also the uniformity of the power transmitted by each of the coupler outputs.

SUMMARY OF THE INVENTION

The present invention has as its object the realization of an optical coupler of the "integrated" type which does not present the problems in required longitudinal dimension or optical losses of the couplers of the prior art technique described above.

These and other objects of the present invention will be apparent from the description which follows, of an optical coupler having an input and $2^n$ outputs, said coupler comprising a plurality of substantially coplanar waveguides, each of said waveguides optically coupling said input to one of said $2^n$ coupler outputs, each of said waveguides comprising a plurality of waveguide sections connecting n Y-junctions disposed along each waveguide path in a tree and branch arrangement, including a first junction ($J_{21}$) having an axis not parallel to that of said coupler which is connected to two second junctions ($J_{31}$, $J_{32}$) by curved waveguide sections without singularities, wherein any inflection point along any one of the waveguides, between the input and the nth stage of the junctions, is situated at one of the n junctions along the waveguide path.

By following this design rule, the required longitudinal dimension of the coupler is minimized, while assuring the necessary transverse spreading out of the waveguides towards the $2^n$ coupler outputs, and providing for waveguide inflections only where they are necessary for this spreading out, that is to say at the junctions. At a minimum we thereby reduce the loss of light energy by avoiding all singularities and by minimizing the number of curvatures along the length of the waveguides, which permits the maximization of the radii of curvature of the curved sections, with a commensurate reduction of the losses due to curvatures.

Thus, following a preferred method of manufacturing the coupler in accordance with the present invention, each junction, except for the input of the coupler, defines an inflection point upon only one of the waveguides passing through this junction. Each junction is comprised of first and second branches of opposing curves tangent to a third branch at a point common to all three branches. The first and second branches are preferably symmetric with respect to the tangent common to the three branches of the junction.

To manufacture the coupler in accordance with the invention, a manufacturing process is utilized according to which a mask is created which reproduces the pattern of the waveguides and the guides are integrated through the mask into a substrate. According to one embodiment of the invention, we define the path of one of the waveguides which is external to the others, and the positions of n junctions along this path as a function of at least one constraint of the group which is formed by: a predetermined axial length of the coupler, a predetermined width of this coupler, the number $2^n$ of outputs, and, a predetermined minimum radius of curvature of the waveguides, and, we determine the positions of the other junctions of the coupler and the portions of the waveguide connecting these junctions by successive duplications of the pattern around the axes of symmetry ($X_2$, $X_1$, $X$) tangent to each junction ($J_{31}$, $J_{21}$, $J_{11}$) of the exterior guide, from the junction nearest to the exit of the waveguide to the junction nearest to the input of this guide.

Other characteristics and advantages of the present invention will appear from the following description and examination of the attached drawings in which:

DESCRIPTION OF THE DRAWINGS

In all of the FIGs. identical references designate identical or similar elements.

DETAILED DESCRIPTION

Figure 1:
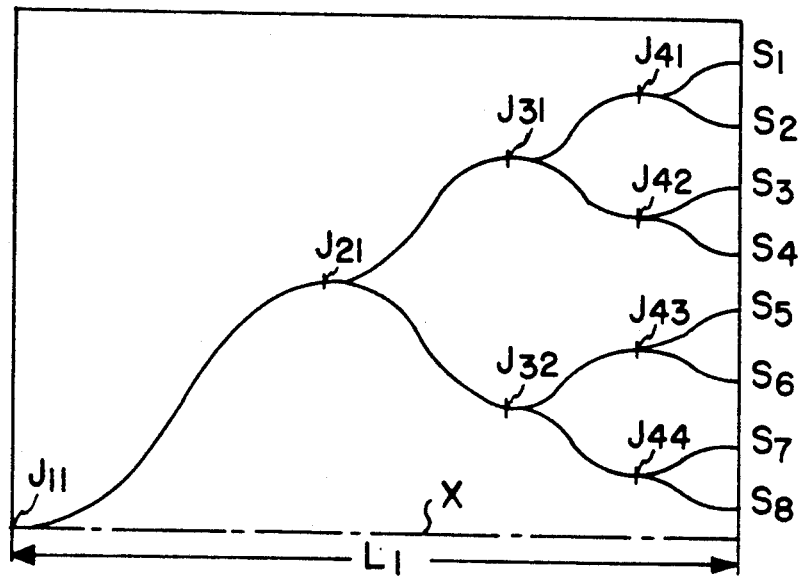
FIG. 1 represents the longitudinally compressed half-pattern of the waveguides of a prior art coupler, which has been described and discussed in the Background of the present specification.
Figure 2:
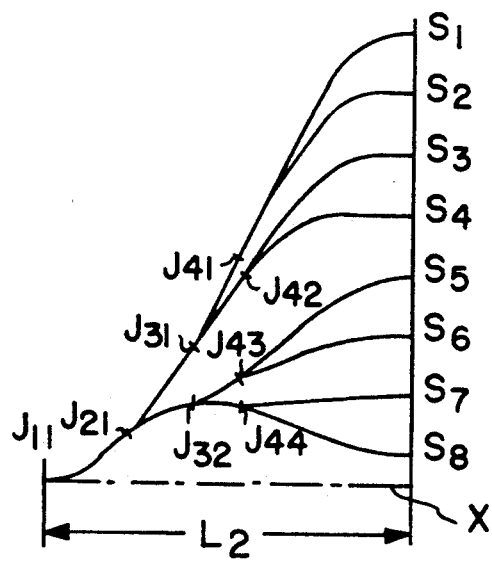
FIG. 2 represents the longitudinally compressed half-pattern of the waveguides of a 1 by 16 coupler in accordance with the present invention.

FIG. 2 of the attached drawings represents a half-pattern of the single mode waveguides of a 1 by 16 coupler in accordance with the present invention, which is useful, for example, in telecommunications. The half-pattern is represented on the same scale as that of FIG. 1 with the same constant separation between outputs S1 to S8, and the same coefficient of longitudinal distortion to permit a comparison of the two patterns. It is immediately apparent that, as in the design of the previous technology represented in FIG. 1, but in contrast with that shown in the Voirin publication cited above, no singularity is present in the waveguide pattern. The waveguide sections joining the Y-junctions J11 to J44 (referenced as were those of the pattern in FIG. 1) present continuous curvatures which lack any inflection point outside the junctions themselves.

Figure 4:
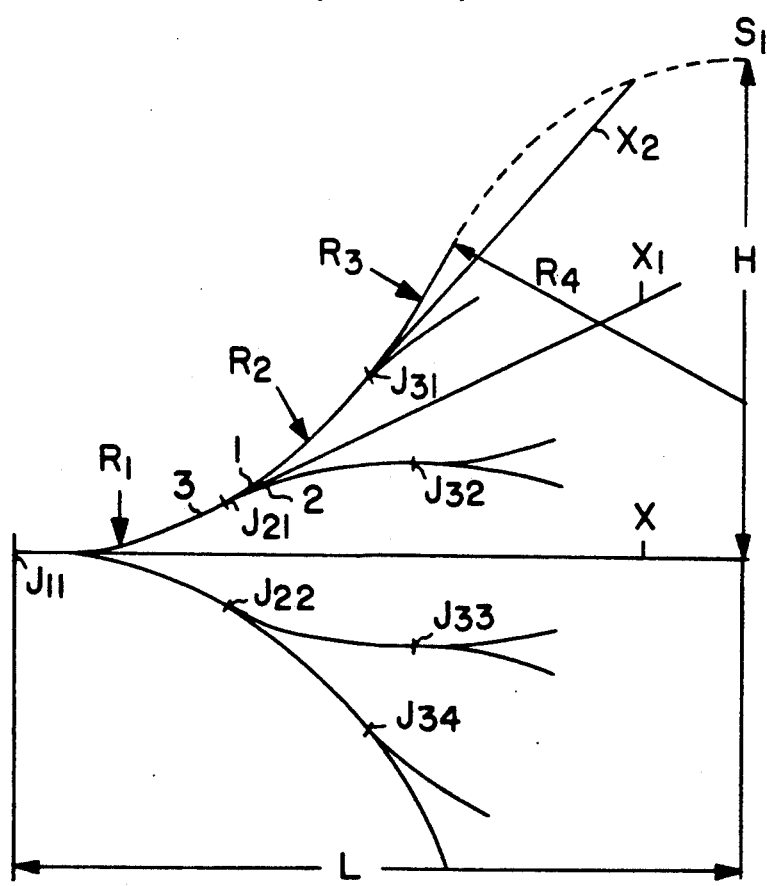
FIG. 4 illustrates the successive stages of the mask pattern for the waveguides of a 1 by 8 coupler according to the present invention, in accordance with a preferred manufacturing process.

Reference is now made to FIG. 4 of the attached drawings to describe more completely the Y-junctions utilized in the invention and the interconnection of the junctions within the waveguide pattern. FIG. 4 will be described later in detail in connection with the description of a coupler manufacturing process in accordance with the invention. In FIG. 4, it is apparent that, in conformity with the present invention, the pattern comprises at least a first junction $J_{21}$ on axis $X_1$ which is not parallel to longitudinal axis $X$ of the coupler, and the first junction $J_{21}$ is connected to two of the second junctions $J_{31}$ and $J_{32}$ by parts of waveguides which are curved and which lack singularities. One of the two waveguides which pass through each of these junctions presents an inflection point, while the curve of the other waveguide does not change sign upon passing this junction.

Thus, each of the Y-junctions which has been utilized in the invention comprises, as junction $J_{21}$, first and second branches 1 and 2, respectively, of opposing curves tangent to a third branch 3 at a point which is common to all three branches. Up to the final stage from junction $J_{31}$ to $J_{34}$ (in the case of a 1 by 8 coupler), the waveguide sections which connect the junctions do not include any inflection points outside the junctions themselves. We thereby limit, in accordance with the invention, the number of inflection points to the minimum necessary for the spreading out of the waveguides. It should be noted, incidentally, that the junctions of the type utilized in the present invention permit a loss reduction of about 0.1 dB per junction, compared with the losses observed with junctions having singularity points represented in the Voirin publication cited above.

We return to the design of FIG. 2 which was established in conformity with the design rules which have just been enunciated. In this design it is apparent that, with the exception of the input junction $J_{11}$, the other junctions present a tangent common to their three branches, which is not parallel to longitudinal axis $X$ of the coupler. The slopes of the tangents with respect to the axis $X$ are generally of the same sign, and this slope increases with the distance from the junction in relation to the axis $X$.

If we compare the designs of FIGS. 1 and 2, it is apparent that this slope results from a lateral deflection of the design of FIG. 1. This permits a closer transverse spreading out of the different waveguides which in turn, for a given number of junctions on each waveguide path, assures a reduction of the required longitudinal dimension of these waveguide paths. We note further that this lateral deflection has the effect of "straightening up" the waveguides by canceling the inflection of the guides between the two junctions and by generally increasing the radii of curvature waveguide sections between the junctions. This is beneficial in reducing the losses of light power known as "losses of curvature."

The result is a regrouping of the junctions into a smaller surface zone than that required by the junctions of the pattern in FIG. 1, and a considerable reduction of the required axial dimension $L_2$ of the waveguides of the coupler according to the present invention as compared with axial dimension $L_1$ of the prior art coupler as represented in FIG. 1 (these axial dimensions are measured between input junction $J_{11}$ of the coupler and the waveguide outputs parallel to the longitudinal axis $X$ of this coupler. In accordance with the present invention, this reduction of required length can reach 50%, and it is accompanied by a noticeable reduction of optical "curvature" losses. This is due to the increase in the radii of curvature of the waveguide sections of the coupler according to the present invention, for a given component length, and the total absence of singularities along the waveguide paths. The decrease in losses obtained by the present invention is particularly sensitive to long wavelengths such as those utilized in telecommunications (for example in the transmission window centered at 1550 nm) where the present invention is particularly applicable.

Considering the required longitudinal dimension of a coupler in accordance with the invention, we have stated that if we choose, for example, a minimum radius of curvature of 100 mm the invention permits the manufacture of a 1 by 16 coupler 35 mm in length, whereas a prior art coupler currently exceeds 60 mm. In addition, the present invention may be utilized to produce a 1 by 8 coupler 25 mm in length and a 1 by 4 coupler only 17 mm in length.

Figure 3:
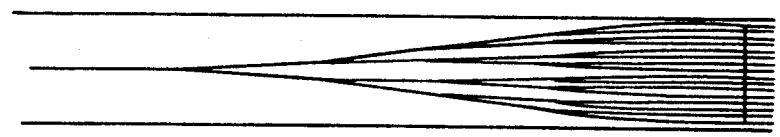
FIG. 3 represents the actual full pattern of the waveguides of a 1 by 16 coupler in accordance with the present invention.

FIG. 3 depicts the actual, undistorted waveguide pattern of a 1 by 16 coupler, as utilized for the manufacture, with a mask, of waveguides integrated upon a substrate by any one of the techniques mentioned in the Background of the present specification. In reality, the mask may comprise a large number of such designs which are identical and adjacent in order to enable the simultaneous exposure of a layer of a photosensitive product spread upon a substrate, to the aggregate of all these designs, as is well known. The reduction of the required dimensions obtained by the present invention permits a very substantial increase in the number of designs to which the photosensitive layer may be exposed, and thereby in the production capacity for this operation. It also permits an increase in the density of integration for optical circuits made up of couplers according to the invention and associated with other optical functions in a monolithic device.

FIG. 4 of the attached drawings is referenced again, to describe, only for the purpose of example, a design process for a mask pattern which may be utilized in the manufacture of a coupler according to the present invention. The partial pattern represented in FIG. 4 corresponds to that of a 1 by 8 coupler, but the rules which will be set forth are certainly applicable to every 1 by $2^n$ coupler.

Beginning with a given longitudinal dimension L and a transverse half-dimension H established based on the number of exits and the separation of these exits, we trace first a waveguide which is external to all the others, for example to that which goes from junction $J_{11}$ to exit $S_1$. The design of this first waveguide is subject to the minimum radius of curvature imposed by the level of acceptable losses, and the positions of junctions $J_{21}$ and $J_{31}$ are predicted as necessary for the spreading out of the exits of the waveguides. A design program is fed into the computer with the constraints enunciated above and other constraints imposed by the invention, that is to say the absence of an inflection point outside the junctions, up to the stage of junctions $J_{31}$ to $J_{34}$, and eventually, the symmetry of the first and second branches of each junction with respect to the common tangents X, $X_1$ or $X_2$ to junctions $J_{11}$, $J_{21}$ and $J_{31}$ respectively.

Through a succession of attempts and corrections of the design, we localize the positions of junctions $J_{21}$ and $J_{31}$ which satisfy all of the constraints which have been established and all of the connection conditions given for these junctions. For example, the exterior waveguide path is formed by arcs of circle of radius R1 between junctions $J_{11}$ and $J_{21}$, R2 between junctions $J_{21}$ and $J_{31}$, R3 beyond junction $J_{31}$, these radii obeying the minimum condition of curvature which has been imposed on the waveguides sections. We deduce thence by successive symmetries around junction $J_{21}$ and tangent X at junction $J_{11}$ the positions of other junctions and the paths which they connect. We end the pattern by connecting by means of trial and error and based on the minimum curvature imposed, the extremities of the paths obtained beyond the junctions $J_{31}$ to $J_{34}$ to the various coupler outputs, as has been illustrated as a dashed line to output $S_1$ with the aid of an arc of a circle of radius $R_4$. Such connections may require the presence of an inflection point beyond the last stage of junctions as is the case of the part of the waveguide which joins junction $J_{31}$ to exit $S_1$.

Of course the present invention is not limited to the particular methods of manufacture described and represented which have been given only for the purpose of example. Thus, other design rules could be adopted to the extent that they respect the instructions of the present invention. Thus, the different parts of the waveguide could each be made of several portions placed end to end and having different curvatures. The rules according to which each junction defines only one inflection and no inflection is present between two junctions may suffer local exceptions for topological reasons without going outside the scope of the present invention. Even though the invention has been described in one application for the manufacturing of a single mode coupler, it applies obviously also to multimode couplers utilized in telecommunications by fiber optics, and it applies to other technologies which require waveguides. Further, the invention is not limited to a coupler which is manufactured of integrated optics but extends to a coupler which is made with separate components, that is to say with individualized fiber optics. Finally, the present invention can also find application in microwave frequencies as in the manufacture of couplers of the "micro-strip line" type upon a dielectric substrate, for example.

We claim:

1. An optical coupler having an input and $2^n$ outputs, said coupler comprising a plurality of substantially coplanar waveguides, each of said waveguides optically coupling said input to one of said $2^n$ coupler outputs, each of said waveguides comprising a plurality of waveguide sections connecting n Y-junctions disposed along each waveguide path in a tree and branch arrangement, wherein:

a first junction having an axis not parallel to that of said coupler is connected to two second junctions by curved waveguide sections without singularities, and wherein any inflection point along any one of the waveguides, between the input and the nth stage of the junctions, is situated at one of the n junctions along the waveguide path.

2. The coupler of claim 1, wherein each junction of the coupler beyond the junction closest to the input of the coupler defines an inflection point upon one of the waveguides passing through said junction.

3. The coupler of claim 2, wherein each junction includes first and second opposing branches of opposing curves tangent to a third branch at a point common to the three branches of the junction.

4. The coupler of claim 3, wherein the first and second branches are symmetrical with respect to the tangent common to the three branches of the junction.

5. The coupler of claim 1, wherein each junction includes first and second opposing branches of opposing curves tangent to a third branch at a point common to the three branches of the junction.

6. The coupler of claim 5, wherein the first and second branches are symmetrical with respect to the tangent common to the three branches of the junction.

7. The coupler of claim 6, wherein at the outputs, the waveguides are parallel to a waveguide at the input of the coupler, the pattern of the waveguides being symmetrical with respect to an axis passing through the junction closest to the input of the coupler.

8. The coupler of claim 1, wherein at the outputs, the waveguides are parallel to a waveguide at the input of the coupler, the pattern of the waveguides being symmetrical with respect to an axis passing through the junction closest to the input of the coupler.

9. The coupler of claim 1, wherein at the outputs, the waveguides are parallel to a waveguide at the input of the coupler, the pattern of the waveguides being symmetrical with respect to an axis passing through the junction closest to the input of the coupler.

10. The coupler of claim 1, wherein the waveguides are single mode.

11. The coupler of claim 1, wherein the waveguides are integrated in a substrate.

12. A manufacturing process for an optical coupler having an input and $2^n$ outputs, said coupler comprising a plurality of substantially coplanar waveguides, each optically coupling said input to one of said $2^n$ coupler outputs, said waveguides comprising a plurality of waveguide sections connecting n stages of Y-junctions disposed along each waveguide path in a tree and branch arrangement, wherein said process includes the step of forming a mask to reproduce the pattern of said waveguides, wherein the design of the mask is generated by the steps of:

a) defining the path of one of the waveguides which is external to the others, and the positions of n junctions along this path as a function of at least one constraint of the group which is formed by: a predetermined axial length of the coupler, a predetermined width of this coupler, the number $2^n$ of outputs, and, a predetermined minimum radius of curvature of the waveguides; and, b) determining the positions of the other junctions of the coupler and the portions of the waveguide connecting these junctions by successive duplications of the pattern around the axes of symmetry tangent to each junction of the exterior guide.

13. The process of claim 12, wherein said determining step is carried out by successive duplications of said pattern from the junction nearest to the exit of the guide, to the junction closest to the input of this guide.

14. The process of claim 12, further comprising the step of connecting the junctions closest to the exits of the coupler while respecting a condition of minimum curvature of the waveguides.

* * * * *